Aug. 7, 1928.

R. HUGERSHOFF 1,679,661

STEREOSCOPIC MEASURING INSTRUMENT

Filed June 1, 1927

Inventor:
R. Hugershoff

By: Marks & Clerk
Attys.

Patented Aug. 7, 1928.

1,679,661

UNITED STATES PATENT OFFICE.

REINHARD HUGERSHOFF, OF DRESDEN, GERMANY.

STEREOSCOPIC MEASURING INSTRUMENT.

Application filed June 1, 1927, Serial No. 195,822, and in Germany October 11, 1926.

When observing a pair of stereoscopic images, for obtaining the normal stereoscopic impression, it is in general necessary for the single image taken from the left-hand position to be presented to the left eye and that taken from the right-hand position to the right eye. An interchange of the position of the single images would produce a pseudo-stereoscopic impression. This case occurs in the continuous measurement of pairs of aerial images $ab$, $bc$, $cd$, the separate images $a$, $b$, $c$, $d$, of which belong to a continuous series of overlapping images. If, after the orientation of the pair of images $a$, $b$ the next image $c$ is to be joined on to the already orientated image $b$, the image $c$ must be inserted in the left-hand carrier of the measuring instrument after the removal of the image $a$, so that it will lie, not in its natural position, but to the left of the previous image $b$.

In order to obtain the normal stereoscopic effect with images placed in the carriers in the opposite position to that in which they were taken, as well as with those placed in the correct position, according to the present invention the pencil of rays coming from the right-hand image must be conveyed to the left eye and vice versa. This is effected by introducing a reflector (reflecting system) or prism (prism system) normally belonging to the path of rays of the right-hand microscope into the path of rays of the left-hand microscope and subsequently or at the same time inserting a reflector (reflecting system or prism system) normally belonging to the path of rays of the left-hand microscope into the path of rays of the right-hand microscope.

Figure 1:
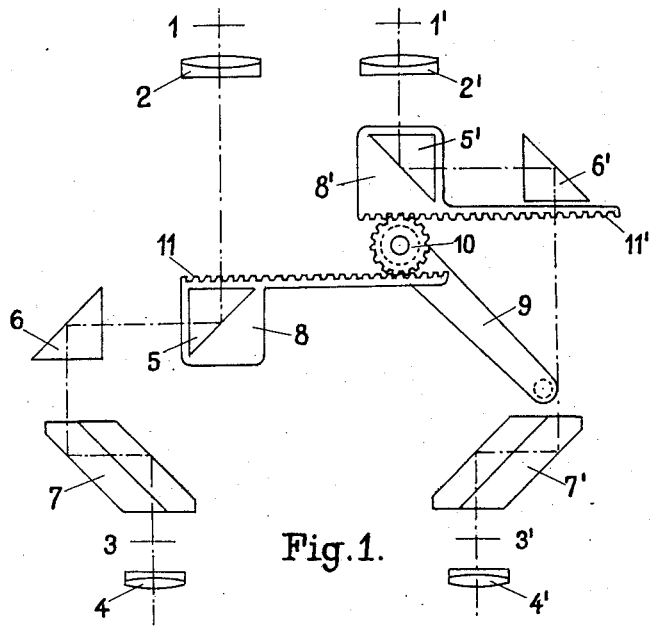
Figure 2:
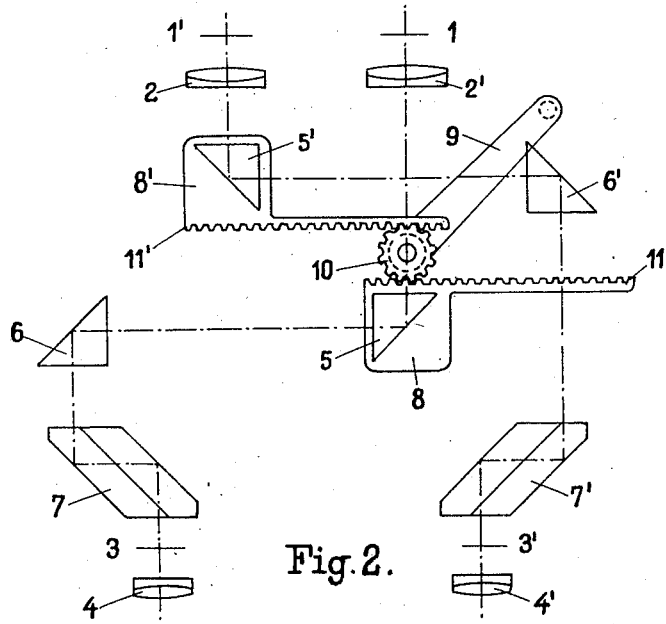

In the accompanying drawing a constructional example of the invention is shown, in which the prisms are changed over simultaneously, in sections through the microscope axes, Figure 1 showing the arrangement of the prisms in the normal case, when the images are inserted as originally taken, and Figure 2 the case in which the images are interchanged.

1, 1' are the measuring images, of which the objectives 2, 2' project real images at 3, 3', which images are observed by means of eye-pieces 4, 4. In the path of the rays within the microscopes are the prisms 5, 6, 7, 5', 6', 7', of which the prisms 6 and 7, 6' and 7' are fixed while the prisms 5, 5' which are fixed on the plates 8, 8', are capable of being displaced with respect to one another. The prisms are displaced by means of the lever 9 which turns a pinion 10 which meshes with the toothed edges 11, 11' of the prism carriers 8, 8'.

When, as indicated above, the measuring images themselves are at 1, 1', the adjusting marks of the measuring microscopes must be positioned at 3, 3'. Preferably the measuring images should be so positioned that the real images of them are projected at 1, 1' by means of the separate lens systems. In this case the adjusting marks may be positioned at 1, 1', so that any inaccuracies in the motion of the prism carriers 8, 8' will have no effect on the accuracy of the measurement.

What I claim is:

1. A double microscope for stereoscopic measuring instruments, comprising in combination two reflecting systems arranged in the paths of rays of the two halves of the double microscope, each of said reflecting systems being adapted to coact with either of the two halves of the double microscope and means for changing over the said reflecting systems from the one path of rays into the other path of rays and vice versa, as and for the purpose set forth.

2. A double microscope for stereoscopic measuring instruments, comprising in combination two reflecting systems arranged in the paths of rays of the two halves of the double microscope, carriers for the said reflecting systems, racks on the carriers and a pinion meshing with the two racks for changing over the said reflecting systems in opposition to each other each from the one path of rays into the other path of rays, as and for the purpose set forth.

3. A double microscope for the stereoscopic measuring instruments comprising in combination two eye-pieces, two measuring marks, two reflecting systems, between the eye-pieces and measuring marks, each of said reflecting systems being adapted to coact with either of the two halves of the double microscope and means for changing over the said reflecting systems from between the eye piece and measuring mark of one half of the double microscope to between the eye-piece and measuring mark of the other half of the double microscope and vice versa, as and for the purpose set forth.

In testimony whereof I have signed my name to this specification.

REINHARD HUGERSHOFF.